United States Patent
Clark, Jr.

(10) Patent No.: US 11,399,526 B2
(45) Date of Patent: Aug. 2, 2022

(54) PORTABLE FISHING ROD HOLDER SYSTEM

(71) Applicant: BUD'S POLEEZE, LLC, Camden, NC (US)

(72) Inventor: Floyd E. Clark, Jr., Camden, NC (US)

(*) Notice: Subject to any disclaimer, the term of this patent is extended or adjusted under 35 U.S.C. 154(b) by 212 days.

(21) Appl. No.: 16/705,959

(22) Filed: Dec. 6, 2019

(65) Prior Publication Data
US 2020/0187477 A1 Jun. 18, 2020

Related U.S. Application Data

(60) Provisional application No. 62/781,373, filed on Dec. 18, 2018.

(51) Int. Cl.
*A01K 97/10* (2006.01)

(52) U.S. Cl.
CPC .................................. *A01K 97/10* (2013.01)

(58) Field of Classification Search
CPC ......... A01K 97/08; A01K 97/10; F16M 13/02
USPC ........... 43/21.2; 248/511, 512, 513; 211/70.8
See application file for complete search history.

(56) References Cited

U.S. PATENT DOCUMENTS

| | | | | |
|---|---|---|---|---|
| 3,344,551 A | * | 10/1967 | Chestnut | A01K 97/10 43/55 |
| 3,487,947 A | * | 1/1970 | Bogar | A01K 97/08 211/70.8 |
| 3,802,652 A | * | 4/1974 | Holton, Jr. | A01K 97/10 248/534 |
| 3,870,259 A | * | 3/1975 | Reynolds | A01K 97/10 248/539 |
| 4,033,648 A | * | 7/1977 | Lopez-Cepero | A01K 97/06 312/100 |
| 4,185,360 A | * | 1/1980 | Prete, Jr. | B25B 25/00 24/68 CD |
| 4,871,099 A | * | 10/1989 | Bogar, Jr. | A01K 97/10 224/566 |
| 5,054,229 A | * | 10/1991 | Hughes | A01K 97/10 43/21.2 |
| 5,095,645 A | * | 3/1992 | Borawski | A01K 97/06 206/315.11 |
| 5,105,574 A | * | 4/1992 | Fast | A01K 97/10 43/21.2 |
| 5,571,228 A | * | 11/1996 | McMurtrie | A01K 97/10 43/21.2 |
| 5,810,192 A | * | 9/1998 | Cruz | B65F 1/12 220/23.4 |
| 5,813,162 A | * | 9/1998 | Tse | A01K 97/10 224/200 |
| 5,975,389 A | * | 11/1999 | Braun | A01M 31/02 182/187 |

(Continued)

FOREIGN PATENT DOCUMENTS

WO WO2002035928 A1 * 5/2002 ............. A01K 97/10

*Primary Examiner* — Brady W Frazier
*Assistant Examiner* — Jodutt Basrawi
(74) *Attorney, Agent, or Firm* — Ward and Smith, P.A.; Ryan K. Simmons

(57) ABSTRACT

A portable fishing rod holder system. The portable fishing rod holder system may include a plate; fishing rod holders mounted to a first side of the plate; storage slot formed on a second side of the plate; and a securing mechanism configured for releasable attaching the fishing rod holder system to a separate structure.

14 Claims, 6 Drawing Sheets

(56) References Cited

U.S. PATENT DOCUMENTS

| | | | | |
|---|---|---|---|---|
| 8,393,111 B1* | 3/2013 | Johnson | ............... | A01K 97/08 |
| | | | | 43/21.2 |
| 9,558,685 B2* | 1/2017 | Lee | ............... | F16M 13/02 |
| 10,034,468 B1* | 7/2018 | Pitts | ............... | A45F 3/047 |
| 10,077,579 B2* | 9/2018 | Brown | ............... | A01K 97/08 |
| 10,798,930 B1* | 10/2020 | Rodriguez | ............ | A01K 97/10 |
| 2007/0119093 A1* | 5/2007 | Jaskulski | ............ | A01K 97/22 |
| | | | | 43/54.1 |
| 2011/0239525 A1* | 10/2011 | Morales | ............... | A01K 97/06 |
| | | | | 43/54.1 |
| 2014/0360086 A1* | 12/2014 | Finlan | ............... | A01K 97/10 |
| | | | | 43/21.2 |
| 2015/0208634 A1* | 7/2015 | Box | ............... | A01K 97/10 |
| | | | | 108/25 |

* cited by examiner

PORTABLE FISHING ROD HOLDER SYSTEM

RELATED APPLICATIONS

This application claims priority to and incorporates herein by reference related U.S. Provisional Patent Application No. 62/781,373 filed on Dec. 18, 2018.

TECHNICAL FIELD

The presently disclosed subject matter relates generally to a fishing rod holder, and more particularly to a portable fishing rod holder that can be attached to another item.

BACKGROUND

Fishing can often require transporting a lot of gear back and forth to a fishing location, especially if fishing from land, for example on a beach or pier. To get to these locations one usually has to park some distance away from where they will actually fish and then walk to the fishing location. For example, surf fishing off a beach usually requires one to walk across the sandy beach to get the water's edge, and for pier fishing one would need to walk some distance down the pier to the desired fishing spot. It can be difficult and cumbersome to walk to the fishing location while carrying all of one's fishing gear, e.g., fishing poles, tackle box, cooler, cutting board, knife, chair, rod holders, etc. Often this can require multiple trips back and forth, or leaving certain equipment behind. In addition, this can lead to dropping equipment along the way, which could damage the equipment and be frustrating to the individual.

Thus, there is a need for a way to make carrying one's fishing equipment, especially while traveling on foot, easier and more efficient.

SUMMARY

In one embodiment, a portable fishing rod holder system is provided. The portable fishing rod holder system may include a plate; fishing rod holders mounted to a first side of the plate; storage slot formed on a second side of the plate; and a securing mechanism configured for releasable attaching the fishing rod holder system to a separate structure. The storage slot may be formed by a portion of opposing side edges of the plate being curved backwards on themselves. The storage slot may further include a lip extending along at least a portion of a bottom edge of the plate, wherein the lip may extend out perpendicular from the second side of the plate. The portable fishing rod holder system may further include a cutting board configured to be stored in the storage slot. The portable fishing rod holder system may further include a retaining mechanism, wherein the retaining mechanism may be configured to secure in place an item stored in the storage slot. The retaining mechanism may include one or more straps. The securing mechanism may include one or more straps. The one or more straps may extend one from each opposing vertical side of the plate. The straps may be adjustable. The connector may be a multipart connector. The portable fishing rod holder system may further include an accessory holder attached to the plate. The portable fishing rod holder system may further include a second securing mechanism, wherein the second securing mechanism may not be a strap. The portable fishing rod holder system may further include a handle mounted or formed on the plate. The separate structure may be a portable structure, such as a cooler. The portable fishing rod holder system may further include one or more spacers mounted or formed on the second side of the plate. The one or more spacers may be mounted or formed on an outside facing surface of the opposing side edges of plate that are curve backwards on themselves to form the storage slot. The one or more spacers may be of a generally wedge shaped structure.

BRIEF DESCRIPTION OF THE DRAWINGS

Figure 1:
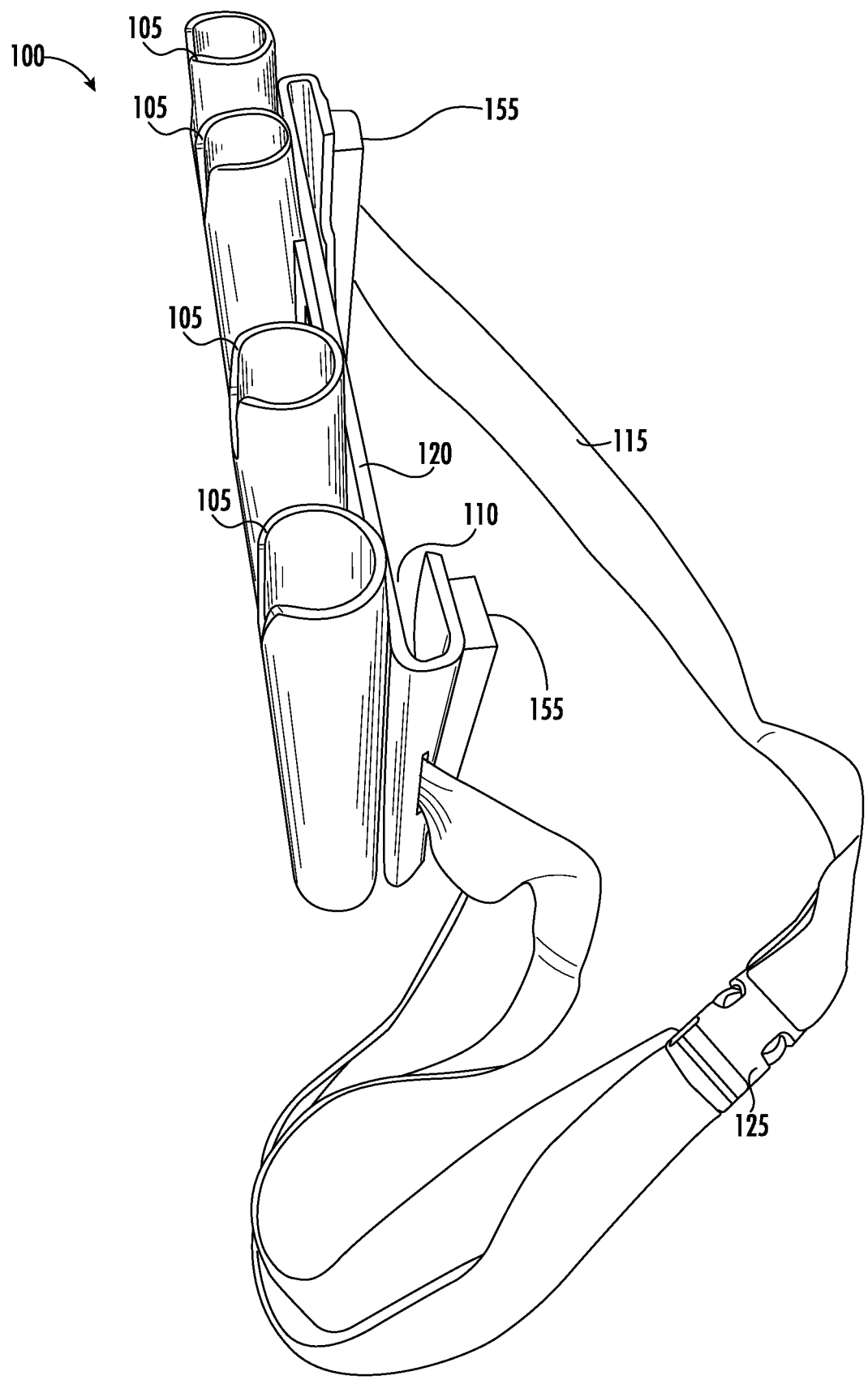
Figure 2:
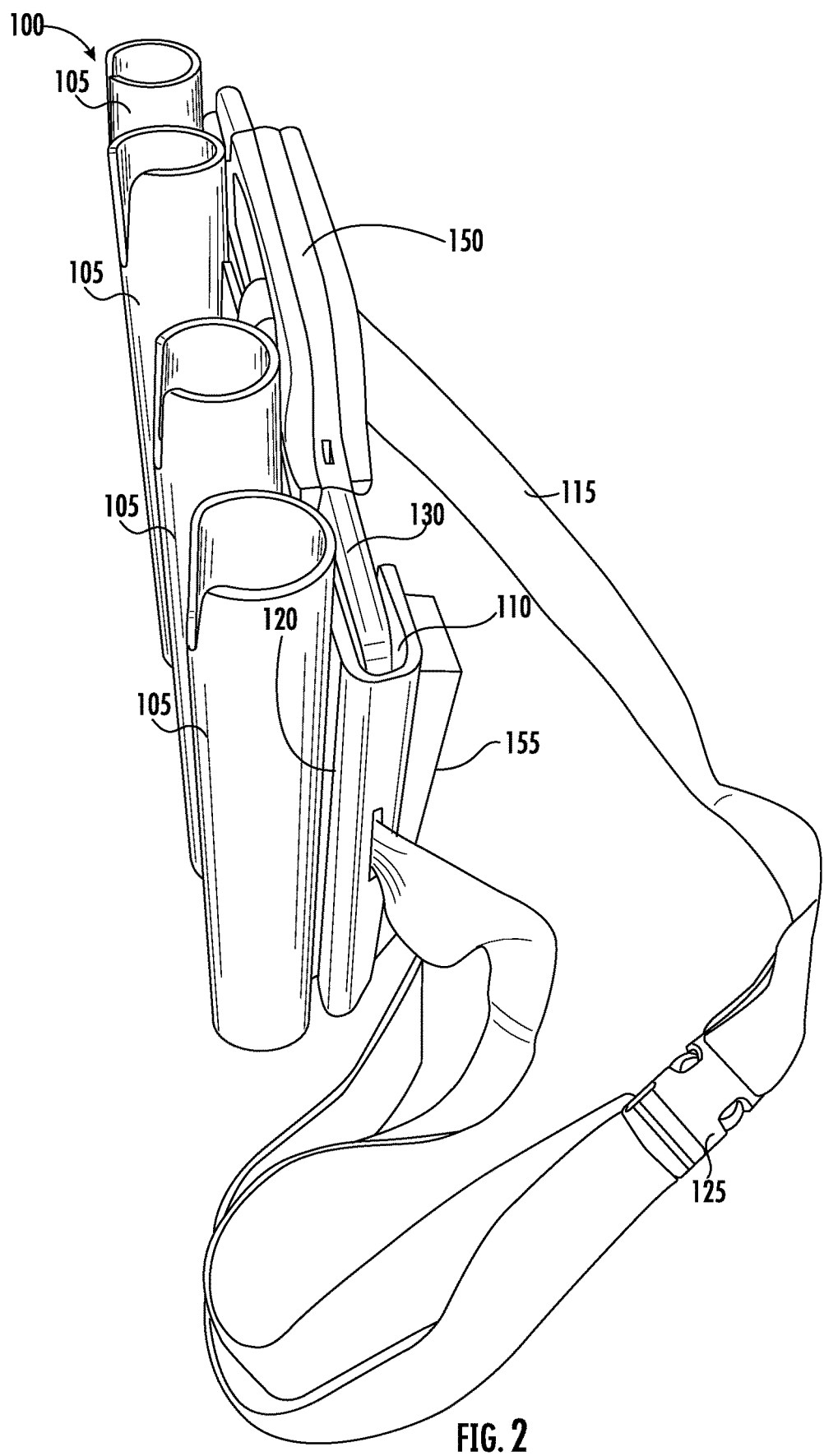
Figure 3:
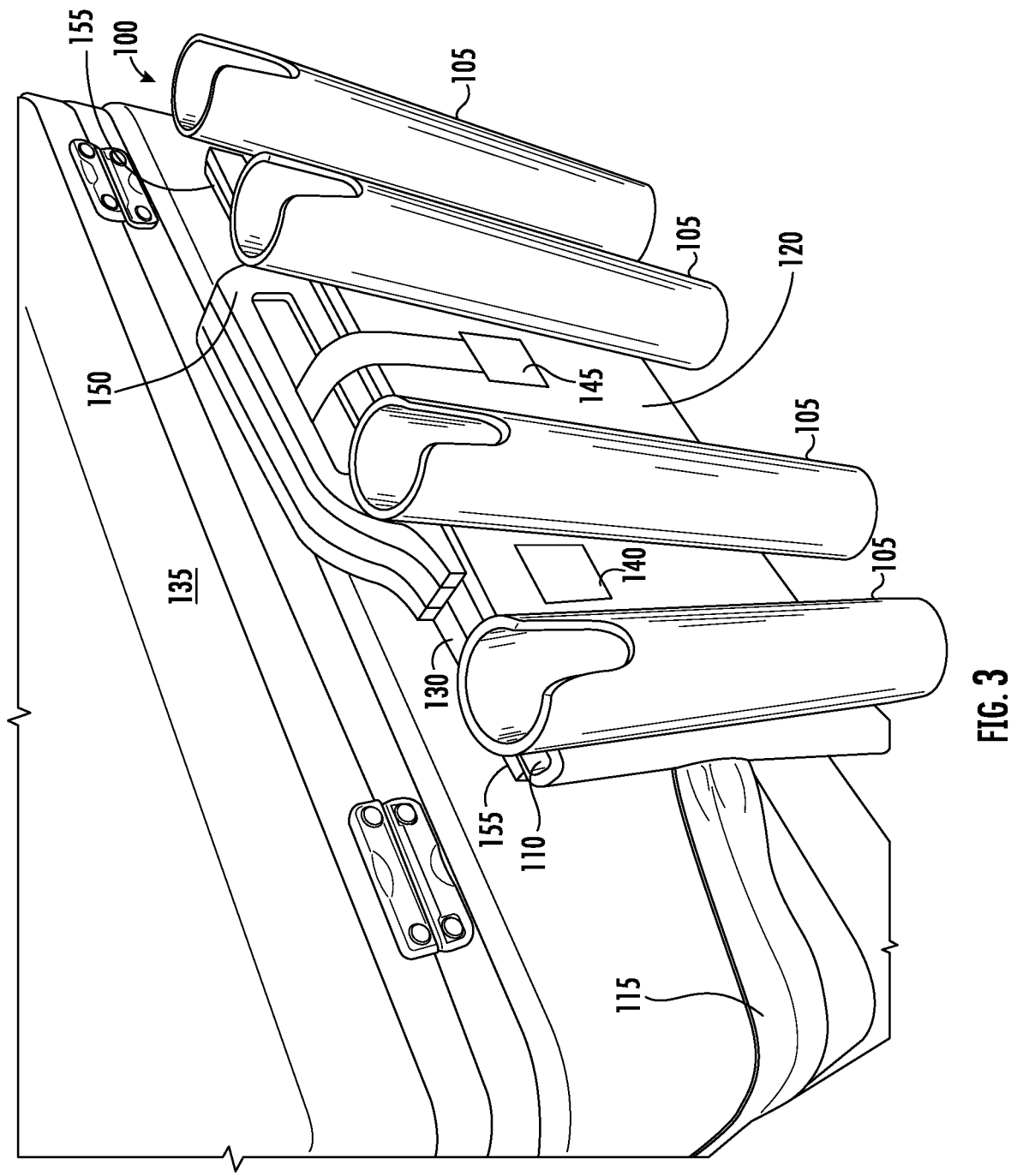
Figure 4:
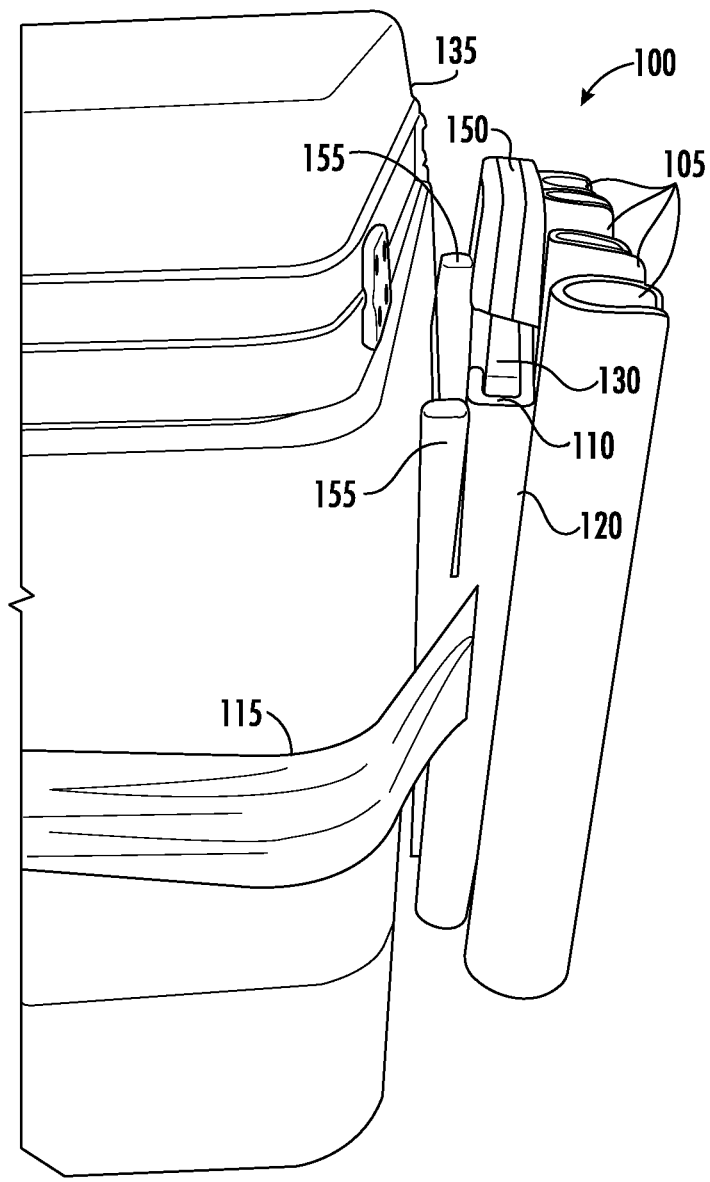
Figure 5:
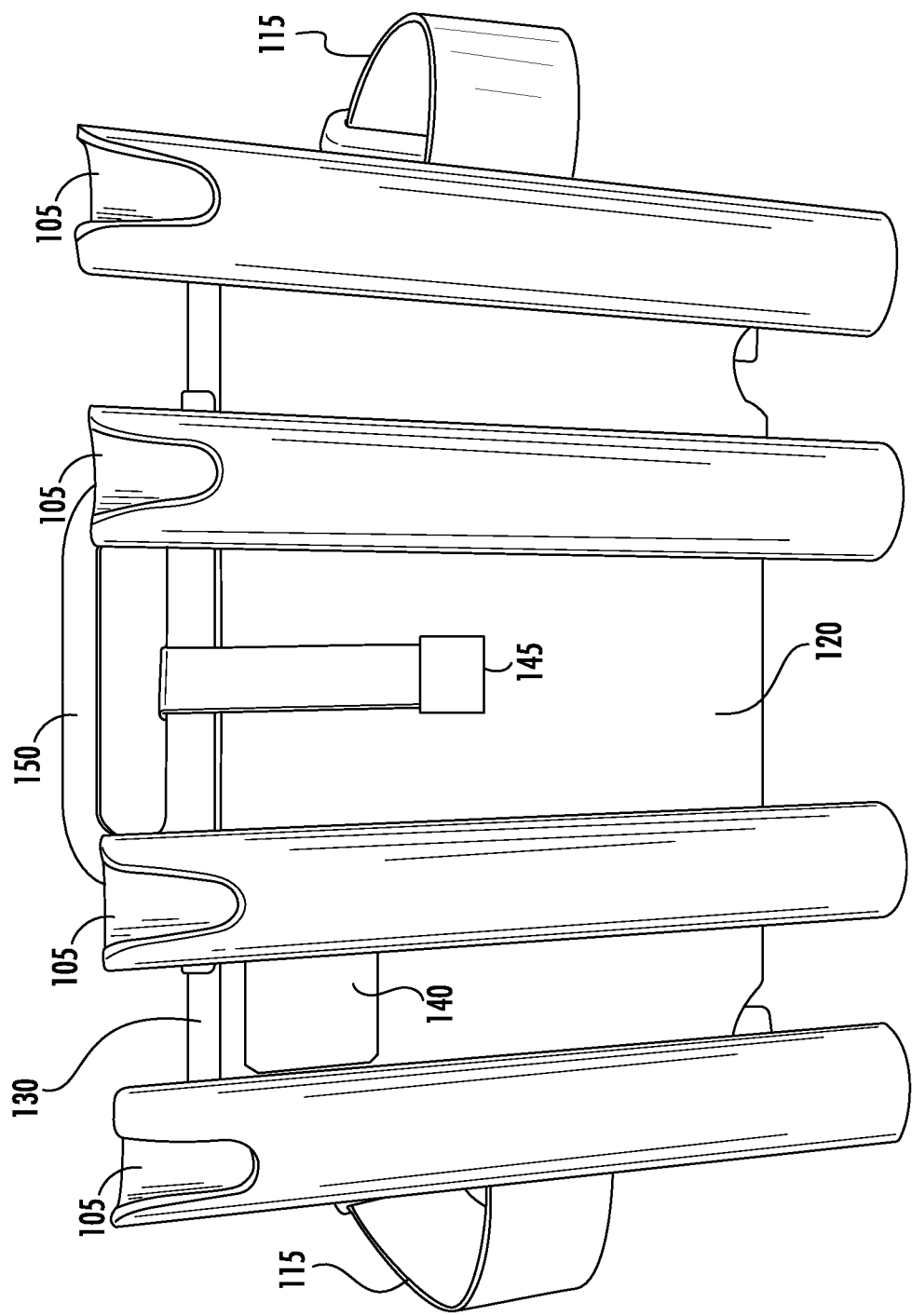
Figure 6:
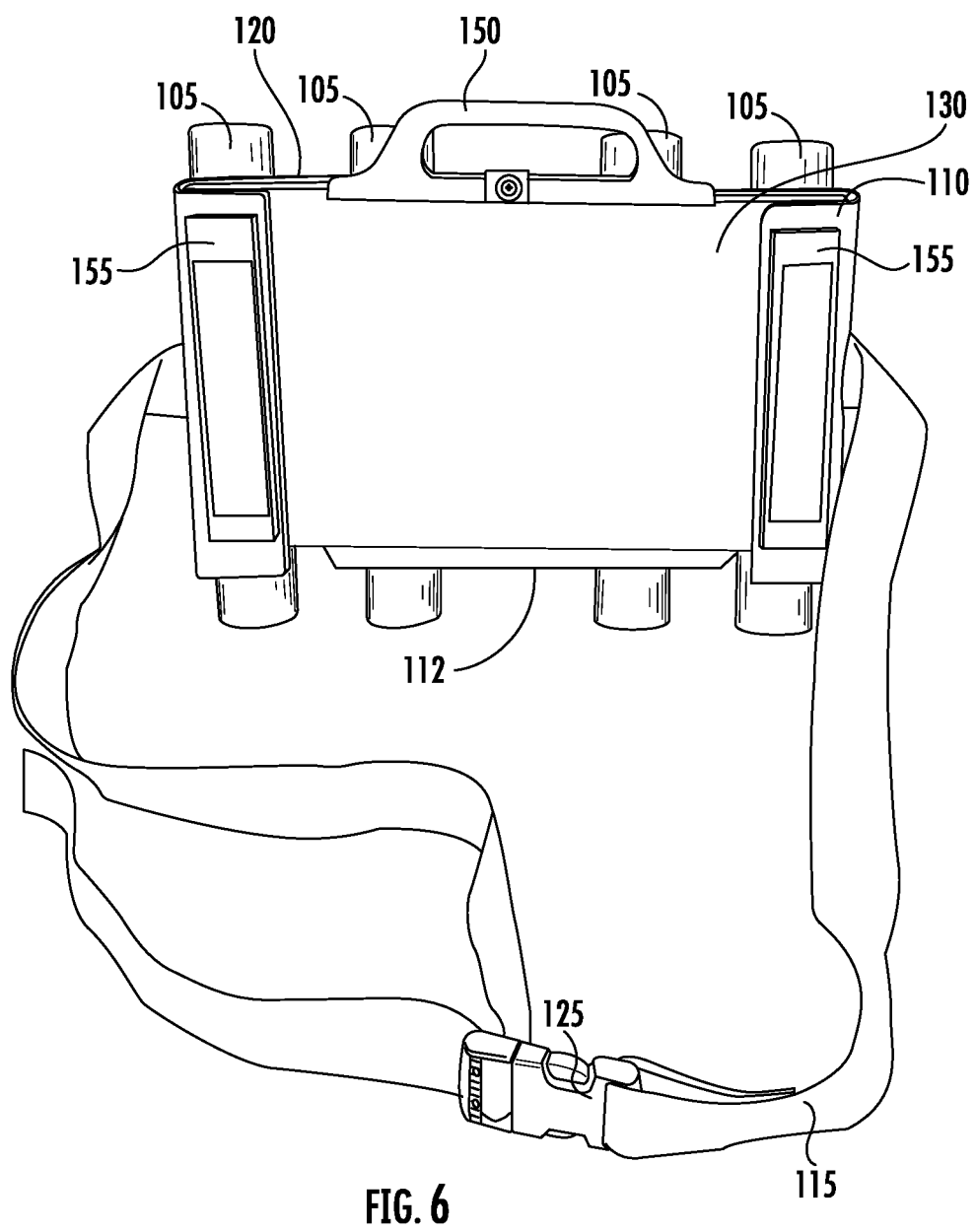

Having thus described the presently disclosed subject matter in general terms, reference will now be made to the accompanying Drawings, which are not necessarily drawn to scale, and wherein:

FIG. 1 illustrates a perspective view of a portable fishing rod holder system in accordance with an embodiment of the invention;

FIG. 2 illustrates another perspective view of the portable fishing rod holder system including a cutting board in accordance with an embodiment of the invention; and FIG. 3 illustrates a perspective view of the portable fishing rod holder system mounted to a cooler in accordance with an embodiment of the invention;

FIG. 4 illustrates a side perspective view of the portable fishing rod holder system mounted to a cooler in accordance with an embodiment of the invention;

FIG. 5 illustrates a front view of the portable fishing rod holder system in accordance with an embodiment of the invention; and FIG. 6 illustrates a rear view of the portable fishing rod holder system in accordance with an embodiment of the invention.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a portable fishing rod holder system that may be strapped, or otherwise attached to various objects, such as, but not limited to, a cooler, boat seat, chair, pier post, etc. The portable fishing rod holder system may include a plurality of individual fishing rod holders, straps for attaching to an item, and one or more storage slots for storing fishing accessories, such as, but not limited to a cutting board. The portable fishing rod holder system may further include one or more fishing accessory attachment points or compartments, for storing additional items such as a knife, pliers, fishing tackle, etc.

Referring now to FIGS. 1 and 2 are various views of a portable fishing rod holder system 100 and its components. Portable fishing rod holder system 100, in one example embodiment, may include one or more fishing rod holders 105, a storage slot 110, and straps 115. The one or more fishing rod holders 105 and storage slot 110 may be formed on or mounted/affixed to a plate 120. In one example, the fishing rod holders 105 may be formed on or mounted/affixed to a portion of a first side of plate 120 and storage slot 110 may be formed on or mounted/affixed to a second side of plate 120. In one embodiment, storage slot 110 may be formed out of plate 120, in one example, opposing side edges of plate 120 may be formed to curve backwards on themselves to form storage slot 110. In other examples, storage slot 110 may be a separate structure mounted/affixed to plate 120. In one non-limiting example, storage slot 110 may have a slot width of about ¼ inch to about 1 inch. The storage slot 110 may further include a lip 112 extending along at least a portion of a bottom edge of the plate 120, wherein the lip 112 may extend out perpendicular from the second side of the plate 120. Storage slot 110 may be configured to house a cutting board, such as cutting board 130.

Plate 120 may be of various shapes and dimensions. In one non-limiting example, plate 120 may be generally rectangular in shape, and may have a length in the range of about 12 inches to about 16 inches, a height in the range of about 6 inches to about 12 inches, and a width in the range of about ¼ inch to about ½ inch. Plate 120 may further include a handle (not shown) mounted thereto or formed there on for a user to pick up the portable fishing rod holder system 100.

Plate 120 may further include one or more spacers 155 formed or attached on the second side of plate 120. In one example, spacers 155 may be formed or mounted on the outside facing surface of the opposing side edges of plate 120 that are curve backwards on themselves to form storage slot 110. Spacers 155 may be of various size and shape. In one non-limiting example, spacers 155 may be wedge shaped. Spacers 155 function to provide a spacing between the backside of plate 120 and a mounting surface (e.g., a cooler 135) to allow for easy removal of an item, such as cutting board 130, from the storage slot 110. Further, in the instance where spacers 155 may be wedge shaped, the portable fishing rod holder system 100 may be mounted to a structure at an angle forward from the structure's surface, which allows the fishing rod holders 105 to be angled forward as well to allow a fishing rod set therein to also be angled forward in the direction of fishing. Spacers 155 may be made of any suitable material, such as, but not limited to plastic, wood, stainless steel, aluminum, or other durable material. Spacers 155 may further provide a protective barrier/layer between the backside of plate 120 and a mounting surface to which the portable fishing rod holder system 100 may be mounted, to prevent damaging the surface it is mounted. For example, in addition to providing a physical spacing, spacers 155 may have a non-abrasive or soft layer (e.g., rubber, felt, cork, or any other suitable material), on the surface of the spacer 155 that contacts the surface of the structure it is mounted.

Straps 115, in one embodiment, may extend from opposing side edges or portions of plate 120, and may include a connector 125 at one or both ends of straps 115 to allow for the straps 115 to be connected together (as shown in FIGS. 5 and 6), and thus allowing the portable fishing rod holder system 100, to be secured to an item, such as cooler 135 (as shown in FIGS. 3 and 4). Connector 125 may be any number of conventional connectors that can be used to adjustably attach straps 115 securely in place to an item, such as cooler 135.

In another embodiment, fishing rod holder system 100 may be attached to an item using an alternative fastener mechanism (not shown), e.g., hook and loop fastener or other suitable alternative fastener mechanism, to be used for example when attaching the fishing rod holder system 100 to an item where straps 115 may not be usable, such as, to a boat gunnel, truck bed, tool chest, or the like. In such an example, the alternative fastener mechanism, e.g., hook and loop, may be disposed or attached to plate 120 on the opposite side of the fishing rod holders 105. For example, one of the hook or loop portion of the hook and loop fastener may be attached to the plate 120 and the other of the loop or hook portion may be attached to the item, e.g., boat gunnel, truck bed, tool chest, or the like, that the fishing rod holder system 100 is to be attached to.

The portable fishing rod holder system may further include one or more fishing accessory attachment points/compartments 140, for attaching/storing additional items such as a knife, pliers, fishing tackle, and/or the like. One or more fishing accessory attachment points/compartments 140 may be any number of structures or attachment mechanisms, such as, but not limited to, clips, rings, sleeves, pockets, slots, hook and loop, tray, box, and/or any other suitable mechanism or structure.

The portable fishing rod holder system 100 may further include a retaining mechanism 145, such as a strap, for securing an item, such as cutting board 130, in storage slot 110 during transport and/or until ready for use. In one example, retaining mechanism may be a strap that is secured to plate 120 at a first end and to an item in the storage slot 110 at its other end. In another example, retaining mechanism 145 may be adjustable, for example an adjustable strap, to allow for it to securely hold an item in storage slot 110. In yet another example, cutting board 130 may include a handle 150, which may extend above a side portion of the plate 120 in a manner that would allow a user to grasp the handle 150. In such an embodiment, a portion of retaining mechanism 145 may be secured to or otherwise engaged with handle 150 and another portion of retaining mechanism 145 may be secured to or otherwise engaged with the plate 120, wherein the portions that attach to or engage with the handle 120 and/or plate 120 may do so via a hook and loop type fastener, or alternatively any other type of suitable fastener. When secured in place, a user may pick the portable fishing rod holder system 100 up by the handle 150.

As shown for example in FIGS. 3 and 4, in operation, a user may place fishing rod holder system 100 against a separate structure, such as the flat side of cooler 135, positioning the fishing rod holders 105 away from the surface of the cooler 135. The user may then secure the straps 115 around an exterior of the cooler 135 using adjustable connector 125 to secure the straps 115 in place. Either before or after mounting the fishing rod holder system 100 to the cooler 135, the user may stow, for example, cutting board 130 in storage slot 110 and may insert the butt end of one or more fishing rods (not shown) in the fishing rod holders 105. The user may further attach/stow additional fishing accessories/tools to or in one or more fishing accessory attachment points/compartments 140. With the fishing rod holder system 100 now secured to the cooler 135, for example a wheeled cooler, the user may now transport the cooler, along with their fishing poles and other fishing equipment, e.g., cutting board, knife, etc., across various terrain with much greater ease.

It shall be appreciated that other dimensions less than or greater than those described herein for the various components of the portable fishing rod holder system 100 are contemplated herein and are therefore within the scope of the invention.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A portable fishing rod holder system, comprising
   a. a plate having a first side and an opposing second side;
   b. fishing rod holders mounted to the first side of the plate;
   c. a storage slot formed on the opposing second side of the plate, wherein the storage slot is formed by a portion of opposing side edges of the plate being curved backwards on themselves, and further includes a lip extending along at least a portion of a bottom edge of the plate and extending out perpendicular from the second side of the plate, and wherein the opposing curved side edges and the lip of the storage slot are configured to receive and retain a cutting board such that the cutting board is retained in place and from falling out a bottom of the storage slot; and
   d. a securing mechanism configured for releasable attaching the fishing rod holder system to a separate structure.

2. The portable fishing rod holder system of claim 1 further comprising a retaining mechanism at an upper portion of the plate, wherein the retaining mechanism is configured such that when the cutting board is disposed in the storage slot and the retaining mechanism is engaged the cutting board is not inadvertently removed through an upper opening of the storage slot.

3. The portable fishing rod holder system of claim 2 wherein the retaining mechanism comprises one or more straps.

4. The portable fishing rod holder system of claim 1 wherein the securing mechanism comprises one or more straps.

5. The portable fishing rod holder system of claim 4 wherein the one or more straps extend one from each opposing vertical side of the plate.

6. The portable fishing rod holder system of claim 4 wherein the straps are adjustable.

7. The portable fishing rod holder system of claim 4 wherein the one or more straps comprise a multipart connector.

8. The portable fishing rod holder system of claim 1 further comprising an accessory holder attached to the plate.

9. The portable fishing rod holder system of claim 4 further comprising a second securing mechanism, wherein the second securing mechanism is not a strap.

10. The portable fishing rod holder system of claim 1 further comprising a handle mounted or formed on the plate.

11. The portable fishing rod holder system of claim 1 wherein the separate structure comprises a portable structure.

12. The portable fishing rod holder system of claim 1 further comprising one or more spacers mounted or formed on the second side of the plate.

13. The portable fishing rod holder system of claim 12 wherein the one or more spacers are mounted or formed on an outside facing surface of the opposing side edges of the plate that are curved backwards on themselves to form the storage slot.

14. The portable fishing rod holder system of claim 12 wherein the one or more spacers comprise a generally wedge shaped structure.

* * * * *